United States Patent [19]

Summers

[11] Patent Number: 5,337,684
[45] Date of Patent: Aug. 16, 1994

[54] MATERIAL DECONTAMINATION APPARATUS AND METHOD

[76] Inventor: Burg W. Summers, 8434 Burwood Park Dr., Spring, Tex. 77379

[21] Appl. No.: 967,156

[22] Filed: Oct. 27, 1992

[51] Int. Cl.⁵ .............................................. F23G 5/12
[52] U.S. Cl. .................................... 110/346; 110/204; 110/229; 432/103
[58] Field of Search ............................... 110/204–210, 110/216, 229–236, 346, 221, 224, 246; 47/DIG. 10, 1.42; 432/103; 405/128

[56] References Cited

U.S. PATENT DOCUMENTS

| | | | |
|---|---|---|---|
| Re. 31,046 | 10/1982 | Lombana et al. | 110/187 |
| 1,831,644 | 11/1931 | Adair et al. | 55/27 |
| 3,954,069 | 5/1976 | Loken | 110/8 R |
| 4,330,411 | 5/1982 | Florin et al. | 210/769 |
| 4,784,603 | 11/1988 | Robak et al. | 432/5 |
| 4,870,911 | 10/1989 | Chang et al. | 110/246 |
| 4,980,030 | 12/1990 | Johnson et al. | 203/4 |
| 5,072,674 | 12/1991 | Noland et al. | 110/346 |
| 5,111,756 | 5/1992 | Anderson | 110/240 |
| 5,117,771 | 6/1992 | Summers | 110/346 |
| 5,133,901 | 7/1992 | Peterson et al. | 252/626 |
| 5,142,998 | 9/1992 | Feitel | 110/215 |
| 5,143,481 | 9/1992 | Schumacher et al. | 405/129 |
| 5,148,757 | 9/1992 | McCrossan | 110/216 |
| 5,178,077 | 1/1993 | Norris et al. | 110/347 |
| 5,199,354 | 4/1993 | Wood | 110/241 |

*Primary Examiner*—Henry A. Bennet
*Assistant Examiner*—William C. Doerrler
*Attorney, Agent, or Firm*—Guy McClung

[57] ABSTRACT

Methods and apparatuses for removing contaminants from materials, particularly vaporizable contaminants from flowable material such as liquids, sludges or soil: and in one aspect, reusing heat produced in the operation to vaporize contaminants from the material.

28 Claims, 5 Drawing Sheets

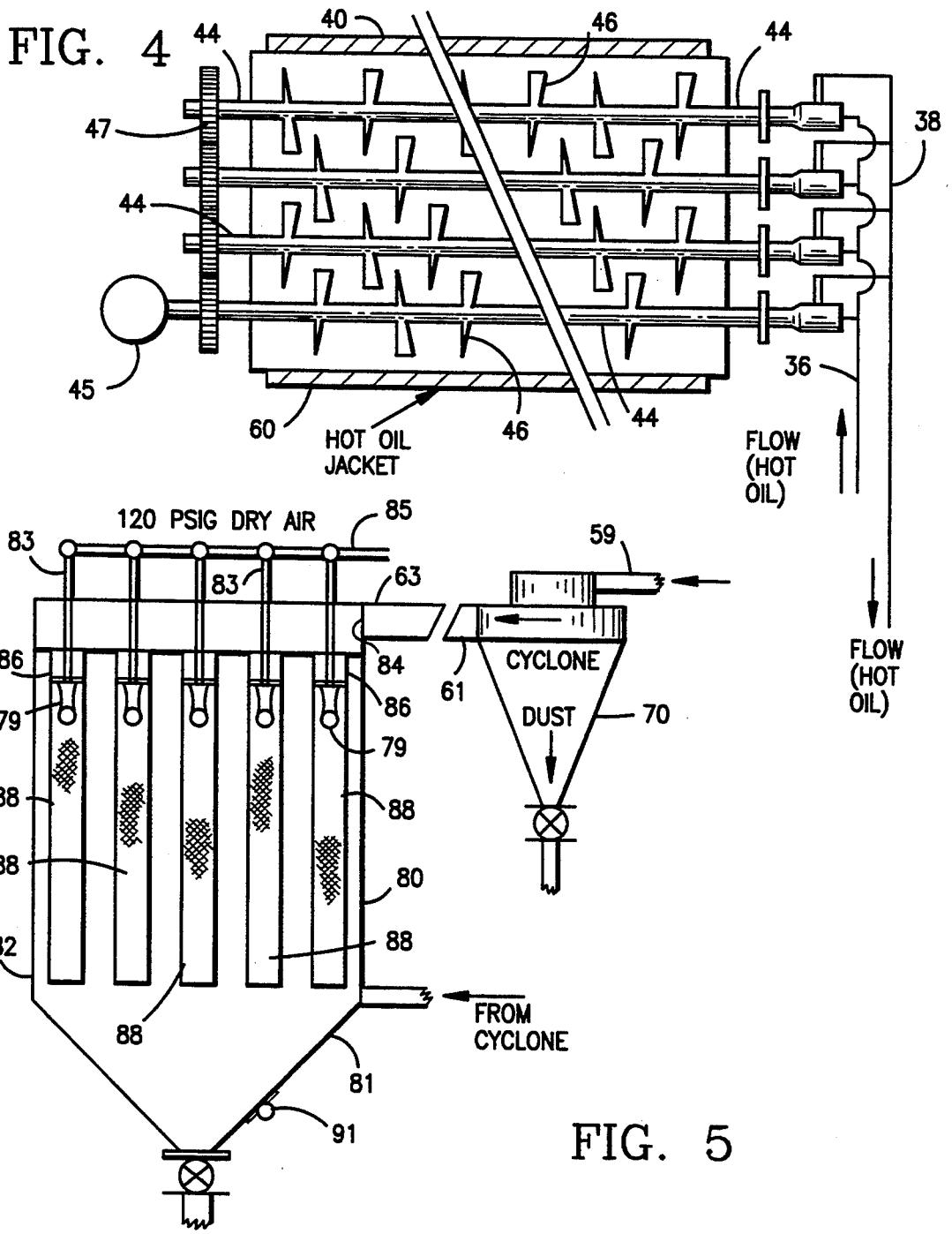

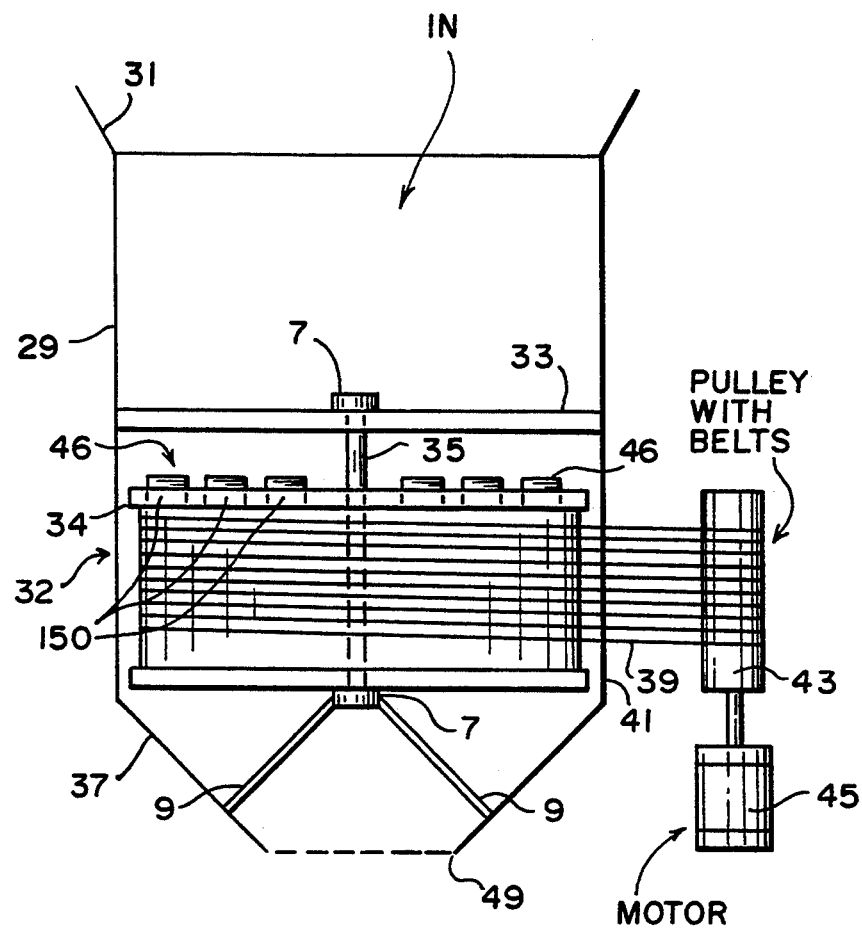
FIG. 7A
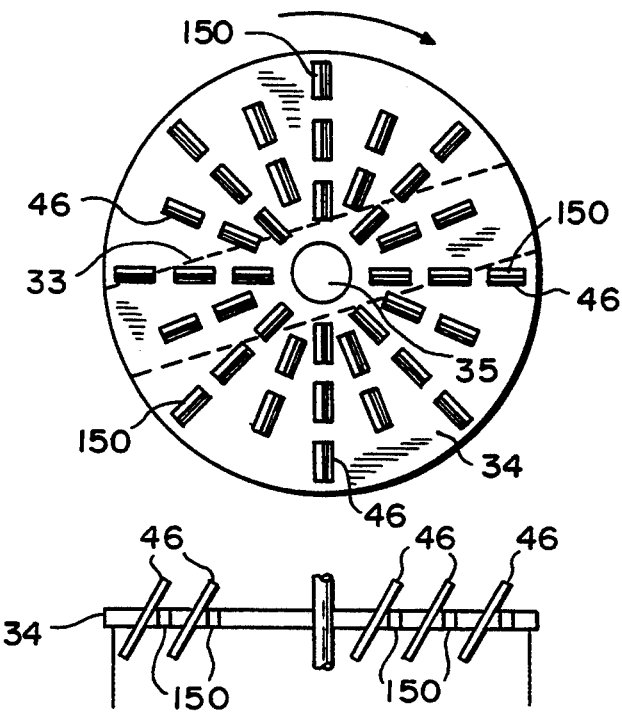
FIG. 7B
FIG. 7C

MATERIAL DECONTAMINATION APPARATUS AND METHOD

BACKGROUND OF THE INVENTION

1. Field of the Invention

This invention relates to decontaminating materials, including but not limited to liquids, sludges and soil. In one aspect this invention is directed to removing vaporizable organic contaminants from material. In another aspect this invention is directed to such processes and apparatuses for providing a relatively hot environment for such removal, and such processes in which heat is used efficiently and effectively.

2. Description of Related Art

Materials such as sludges and natural soil have been contaminated with toxic and dangerous materials such as gasoline, chemicals, diesel oil, cleaning solvents and the like. The presence of these contaminants results in environmental and health hazards. Many organic liquids that contaminate soils are toxic and carcinogenic and find their way into drinking water formations from contaminated soils. Organic contaminants from contaminated soil enter waterways and pollute and contaminate them, endangering human beings and killing fish and wildlife.

In my previous patent, U.S. Pat. No. 5,117,771 entitled "Method And Apparatus To Decontaminate Soil," incorporated fully herein by reference, I disclosed a method and apparatus for decontaminating soil. This invention did not provide for the removal of water from sludges, nor did it provide heat sufficient to remove liquids and certain contaminants from sludges. This invention did not provide for vaporized contaminant gases to be "swept" from a heating chamber. This invention could not be used at desired higher temperatures since it provided heat transfer fluids that could only be heated to about seven hundred degrees Fahrenheit and it did not use waste heat effectively. The invention included a method and apparatus for decontaminating soil that has been contaminated with vaporizable contaminants in which contaminated soil is conveyed through a treatment vessel by means of an auger with internal passages with a hot heat transfer fluid flowing through them. As the contaminated soil passes through the treatment vessel, it is heated to a point where the contaminants are vaporized and are withdrawn from the treatment vessel. Air is added to the interior of the treatment vessel from the atmosphere to lower the temperature of vaporized gases, but not to lower the temperature to such a point that the gases condense. Such condensation adversely affects downstream filtration efforts, e.g. resulting in undesirable coating of filter bags. Control means control the amount of air added to the treatment vessel to ensure that the oxygen level in the mixture of vaporized contaminates and air does not fall within a flammable or explosive range. Following the vaporization of the contaminates from the soil, the treated soil is removed from the treatment vessel.

Other prior art attempts to decontaminate soil that is contaminated with vaporizable contaminants include various types of solvent extraction of washing procedures utilized in an attempt to wash the contaminants from the soil. These attempts are costly, and have not been overly successful in removing such contaminants from soil. Other methods have involved heating soil in an attempt to vaporize the contaminants and drive the contaminants from the soil. Heating processes that employ heated kilns have not been too successful because of poor heat transfer, the tendency of moist soils to "ball up", dust formation and the like.

U.S. Pat. No. 4,738,206 discloses a method and apparatus for utilizing a heating vessel with a heated screw conveyor to heat soil as it is moved through the vessel to "vapor strip" contaminants from the soil. This method and apparatus have several problems. The method and apparatus provide for the exclusion of oxygen or air inside the heated stripping chamber which poses severe operating problems and requires that air locks or seals in other apparatus be utilized to rigorously exclude the entry of air into the heated chamber.

There has long been a need for efficient and effective methods and apparatuses for decontaminating material. There has long been a need for such methods and apparatuses which can employ relatively high temperatures. There has long been a need for such methods and apparatuses which can be used to decontaminate sludges as well as soils. There has long been a need for such methods and apparatuses which do not waste heat produced during operation.

SUMMARY OF THE PRESENT INVENTION

In one embodiment of the present invention a system is provided for decontaminating material which includes a conveyor for introducing the material into a treatment vessel, the treatment vessel having one or more hollow augers rotatably mounted therein through which a hot liquid is pumped and flows to heat the material and vaporize vaporizable contaminants, including but not limited to volatile combustible contaminants, in the material. It is preferred that the system be closed or substantially closed and that a large percentage of the heat value of vaporized contaminant gas, produced in the process, preferably more than fifty percent and most preferably ninety nine percent or more, be re-used in the process. The vaporized contaminants rise or are vacuum drawn up in the vessel and exit it through one or more overhead exit ports. The contaminant vapors then, preferably, flow to a filter device for removing particulates entrained in the vapor. A temperature control is used to insure that the hot vapors are cooled to such a point that they do not adversely affect filters in the filter device, but they are kept above the condensation temperature. In certain preferred embodiments this allows temperatures in the treatment vessel of about one thousand six hundred degrees fahrenheit. The vapors then flow to a combustion chamber in which they are heated to combust oxygen and other combustible vapor components, making use of the heat value generated thereby. In certain preferred embodiments, vapor residence time in the chamber is about two seconds (or three hundred percent greater than in certain previous processes). The heated vapors are then used directly and/or indirectly to provide heat for the decontamination operation.

In another embodiment the flow of re-heated vapors is split and a first part (most preferably about ninety percent of the total flow) is used to contact material in the decontamination vessel to increase the temperature therein (e.g. to a temperature greater than one thousand degrees Fahrenheit) and a second part of the re-heated vapors is used to assist in heating the hot fluid, e.g. oil, which flows through the rotating augers.

In another embodiment particulates are removed from the vaporized contaminants in a separator prior to cooling and introduction to the filter device. An air dryer may be used to dry air flowing through the filter device and a compressor may be used to facilitate filtration of particulate by flowing compressed air to insure that filter bags within the device do not become clogged with particulate. An electronic monitoring system can be used to monitor the pressure drop across the bags and then to initiate a physical "popping" of the bags to dislodge clogging particulate as needed to maintain sufficient flow for filtration. Compressed air can also blow off unwanted particulate.

In one embodiment a method and apparatus according to this invention provide a substantially closed system in which contaminant vapors are totally or substantially maintained within the system; thus exhausted vapors only minimally, if at all, adversely affect the environment. For example, since the contaminant vapors are re-heated and used to convey heat useful in the operation itself, preferably only minimal exhaustion of, and most preferably no exhaustion of, contaminating vapors occur, (e.g. leakage from the various separators and filters and some, usually minimal, discharge from the fluid heater).

In another embodiment the treatment vessel has plate diffusers disposed in front of vapor exit ports. Particulates entrained in the vapor impinge on the diffusers and fall back into the vessel rather than flowing out from the vessel with the vapor, thereby reducing the need for downstream separation and filtration.

In one embodiment, sludge to be decontaminated is treated to remove water prior to introduction to the conveyor that feeds material to the treatment vessel. In another embodiment an oxygen level sensor monitors the oxygen level of the re-heated vapors (which are preferably substantially inert due to combustion of substantially all combustible gases such as oxygen) so that the introduction of oxygen into the treatment vessel is substantially minimized (preferably the oxygen level is eleven percent or less and most preferably two percent or less).

It is, therefore, an object of at least certain preferred embodiments of the present invention to provide:

New, useful, unique, efficient and effective devices and methods for decontaminating material;

Such devices and methods for removing vaporizable contaminants;

Such methods and devices for removing contaminants from materials, including but not limited to, liquids, sludges or soil;

Such methods and devices in which heat produced by burning components of a vaporized contaminant stream is efficiently and effectively re-used in the process;

Such devices and methods in which the re-used heat is used both in the treatment vessel to directly heat contaminated material and in a heating vessel to heat fluid which flows to indirectly heat the material;

Such devices and methods which are operable at relatively high temperatures and which have temperature controls so that the temperature of hot contaminant vapors can be controlled and reduced for further effective processing;

Such devices and methods in which particulate entrained in vaporized contaminants are prevented from exiting a treatment vessel and/or are separated and/or are filtered from a contaminant vapor flow stream;

Such devices and methods in which contaminant vapors are heated to drive off and/or use heat from combustible components such as oxygen, reducing levels of such components so that the vapor stream may be effectively used to employ the heat therein.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as other inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to system to other equally effective equivalent embodiments.

FIG. 4 is a top schematic view of the treatment vessel of the system of FIG. 1.

FIG. 5 is a side schematic view in cross-section of a filter device of the system of FIG. 1.

FIG. 7A is a side schematic view of a shredder according to the present invention. FIG. 7B is a top view of a cutter disc of the shredder of FIG. 7A. FIG. 7C is a side view of the disc of FIG. 7B.

DESCRIPTION OF EMBODIMENTS PREFERRED AT THE TIME OF FILING FOR THIS PATENT

Figure 1:
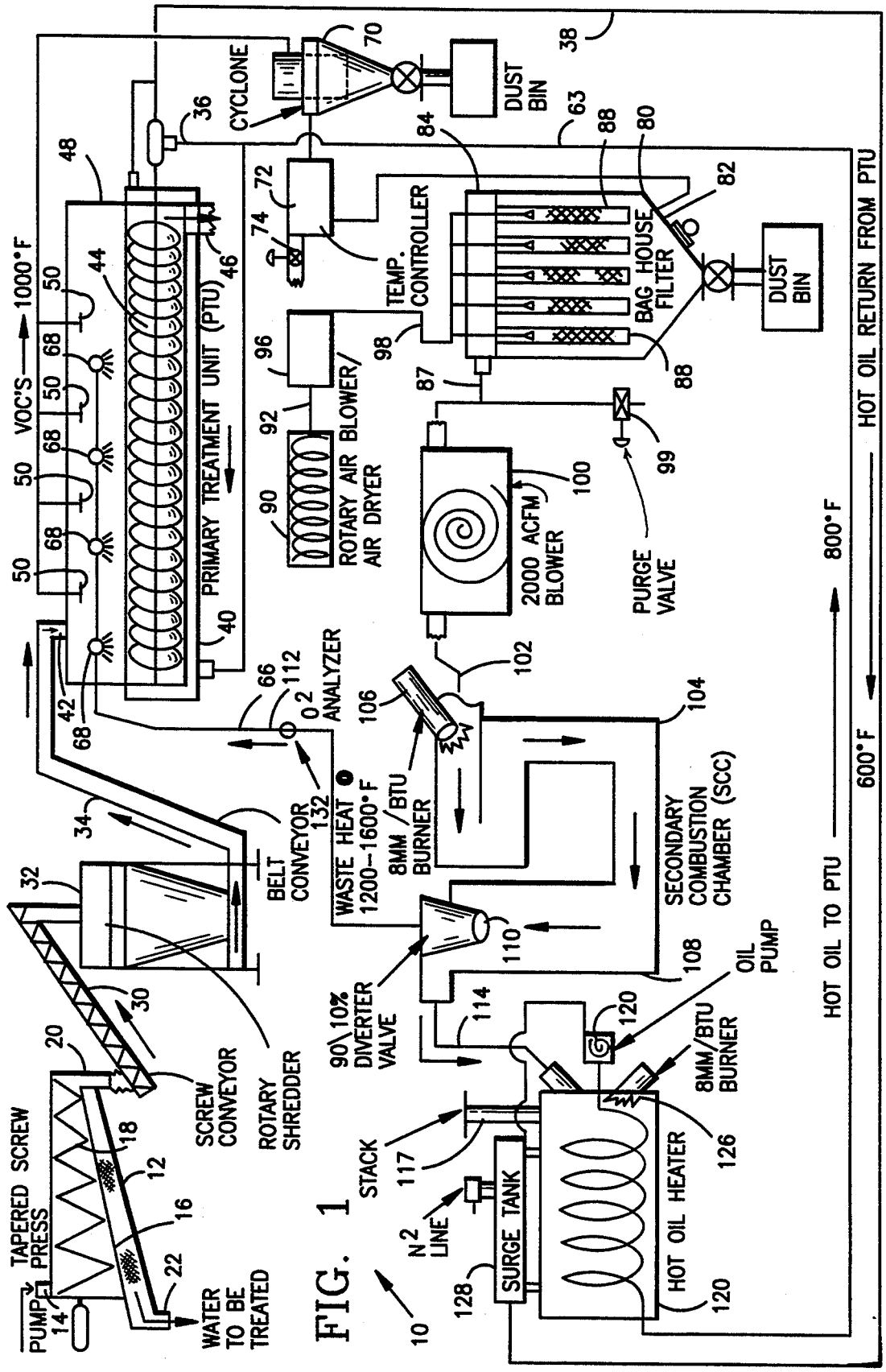
FIG. 1 is a schematic view of a system according to the present invention.
Figure 6A:
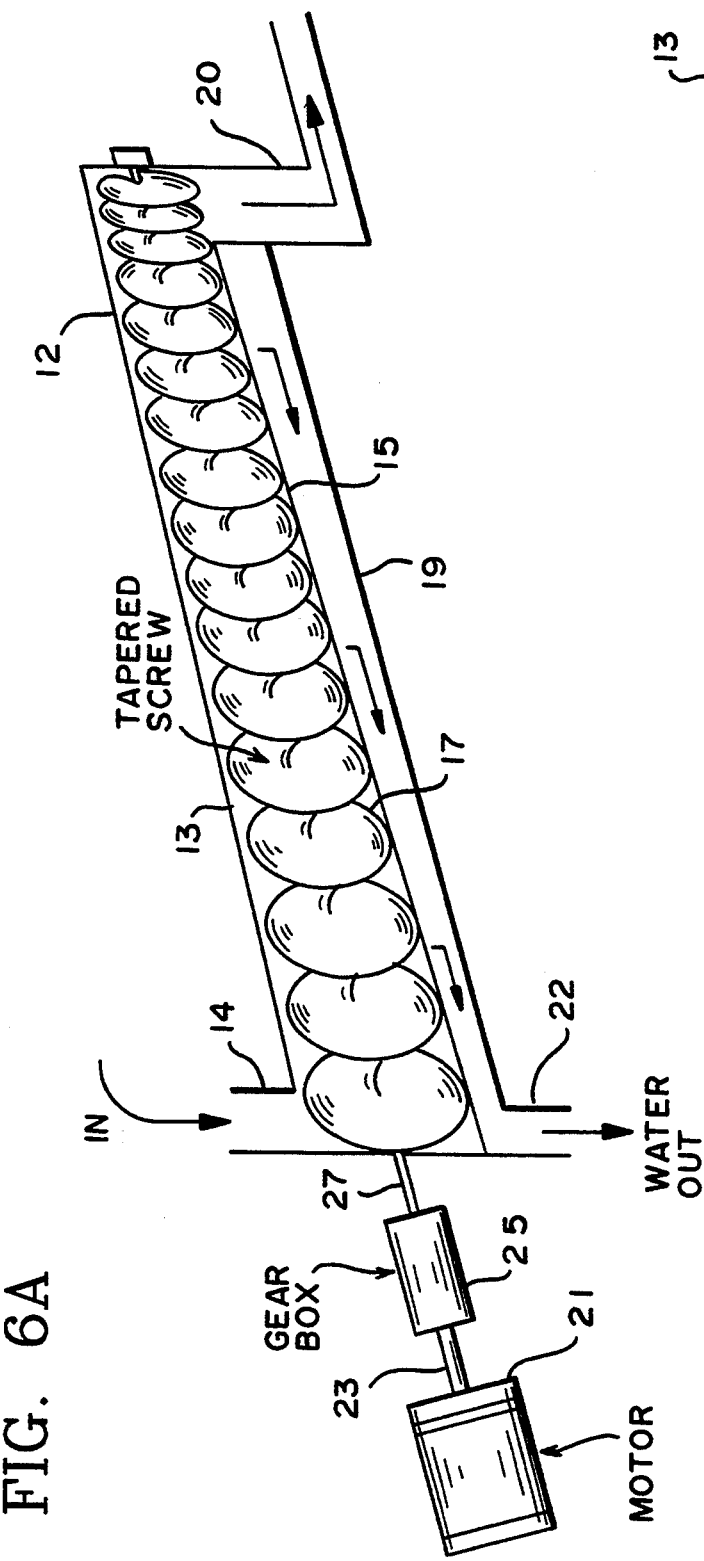
FIG. 6A is side schematic view of a tapered screw press according to the present invention.

Referring now to FIG. 1, a system 10 according to the present invention has a material pre-treatment device 12 with an inlet 14 through which contaminated material, e.g. sludge or soil, is introduced into a vessel 16, preferably a tapered screw press as shown in FIG. 6A. An internal screw conveyor 18 moves the material upwardly to a top discharge outlet 20. Water from the material flows out from a bottom discharge outlet 22.

The material is then introduced to a screw conveyor 30 which removes unwanted material such as concrete, metal, etc. and then moves the material to a rotary shredder 32 (FIG. 7A) which shreds the material reducing it in size to pieces ranging preferably between one half inch and two inches in size and also removes undesirable materials such as rock, concrete, rebar, etc. A belt conveyor 34 moves the shredded material from the shredder 32 to an inlet port 42 of a treatment vessel 40. A plurality of hollow augers 44 are rotatably mounted in the vessel 40. The augers 44 are rotated by a motor 45 and interconnecting gears 47. A hot fluid, e.g. oil, is circulated through one or more flow passages in the augers 44 via an oil inlet line 36 and an oil outlet line 38. The augers 44 have flights 46 (see FIG. 4) which contact, knead, chop, and move through the material for uniform heating. The flights 46 are disposed and configured so that the augers 44 move the material to a material discharge outlet 46.

Vaporizable contaminants from the material, (e.g. but not limited to benzene, toluene, ethylene, xylene, hexane, pentane, octane, isooctane, cyclohexane, olefins, cyclopentane, octene, isoprene, cycloolefins, and styrene) within the treatment vessel 40 to a dome 48 through which are disposed outlet diffusers 50. (see also FIGS. 2 and 3). The diffusers 50 include a hollow tubular member 52 with solid end closure plates 54 and a plurality of flow slots 56. A part of particulate entrained in the rising vapors impinges on the plates 54 and falls back into the material in the vessel 40. It is preferred that the plates 54, slots 56, and members 52 are sized and configured so that about at least half of the entrained particulate are prevented from flowing into the members 52, with at least seventy five percent most preferred. Vapors flow from the tubular members 52 into a manifold 58 and then to an exit line 59. Typically temperatures in the vessel 40 are between one thousand degrees fahrenheit and one thousand six hundred degrees fahrenheit.

The vessel 40 is surrounded by a hot oil jacket 60 with an inlet 62 and an outlet 64 interconnected with the flow lines 36 and 38. Baffles 69 insure an adequate residence time for the fluid in the jacket 60. Treated, preferably substantially inert gas, is fed into the vessel 40 to directly contact the contaminated material through an inlet line 66 and then through interior outlets 68 mounted on the vessel 40.

The vapors flow through the exit line 59 to a separator 70, e.g. a typical high density cyclone separator which is well sealed and, preferably, has a volume throughput of about one thousand five hundred actual cubic feet per minute. In the separator 70 dust and entrained particulate are removed from the vapors. Preferably about at least five percent and most preferably at least fifteen percent of the particulates entrained in the vapor are removed by the separator 70 (i.e. fifteen percent of the total flow in line 59).

Vapors in the line 59 are typically at a temperature of seven hundred to eight hundred degrees fahrenheit and vapors in a line 61 from the separator 70 are typically at a similar temperature. So that these relatively hot vapors do not adversely affect filter bags in a filter device 80 made from, e.g. Nomex (TM) material, a temperature control device 72 receives the vapors in the line 61, senses their temperature, and, if necessary opens a valve 74 to permit dry air at ambient temperature to mix with the vapors to reduce their temperature to an acceptable level, e.g. to about at least four hundred degrees fahrenheit or less, with at least about three hundred degrees fahrenheit most preferred for this embodiment. The cooled vapors flow in line 63 to the filter device 80.

The filter device 80 has a housing 82, an inlet 84 in communication with the line 63, a plurality of filter bag cages 86, a filter bag 88 made from a filtration medium and corresponding to each cage 86, pressure lines 83 to a "horn" 79 mounted in each filter cage and bag, a manifold 85 for pressurized fluid flow, and an outlet line 87. Filtered particulates are, preferably, removed from a bottom bin 81 of the housing 82 via a rotary valve 89. A compressor 90 supplies air under pressure through a line 92 to a dryer 96 and to the horns 79 to provide pressurized air to the filter bag interiors to prevent particulate build-up thereon. A vibrator 91 on the bin 81 helps remove dust and material that lodges on the bin walls. A dryer 96 between the compressor 90 and the filter device 80 drys the compressed air, preferably to a moisture content of about two percent or less. Air flows from the dryer 96 in a line 98 to the manifold 85. Preferably substantially all of the particulates are filtered from the flow stream.

A purge valve in line 87, when opened, e.g. or about five minutes prior to heating in a combustion chamber 104, permits gas built up in the chamber to be purged to prevent inter alia, explosions. A blower 100 moves the vapors in the system 10 and moves them via line 102 to the combustion chamber 104 which is heated with a burner 106, e.g. a low nitrogen oxide eight million btu/hour burner commercially available from Eclipse Burner Corporation with a twenty-to-one turndown ratio. (twenty parts vapors to one part air). The vapors can be heated to any desired temperature. In this particular embodiment they are preferably heated to about one thousand six hundred degrees fahrenheit, thus burning combustible gases such as oxygen and vaporizable organic contaminants and semi- volatile components and thereby reducing the levels of these components in the vapor stream, producing an essentially inert, very hot stream which exits the chamber 104 in a line 108.

A diverter valve 110 in the line 108 is used to split the hot vapor flow so that part of it (in line 112) can be used to directly heat material in the vessel 40 and part of it (in line 114) can be used to heat the oil in a hot oil heater 120. (It is within the scope of this invention to directly heat the material without using heat from the chamber 104, but such an additional heat source is not presently preferred). In the particular embodiment shown in FIG. 1, it is preferred that about ninety percent of the hot vapors flow to the vessel 40 and about ten percent flow to the hot oil heater 120. An oxygen level sensor 122 in the line 112 senses the level of oxygen in the line 112. It is preferred that the oxygen level be maintained at two percent or less. It is also preferred that the residence time of the vapor in the chamber 104 be long enough to reduce the level of combustible components to a desired level and, correspondingly, long enough to raise the vapor temperature to a usable level. In the embodiment shown a residence time of at least two seconds is preferred.

Hot vapors flow from the line 112 to the line 66 and then into the vessel 40. Hot vapors flow from the line 114 to an inlet 124 of the hot oil heater 120. A burner 126 (like the burner 106) provides heat to oil in the heater 120. A pump 129 pumps oil from the heater 120 through the line 36 to the vessel 40 (at a temperature of about eight hundred degrees fahrenheit in this embodiment). Oil returns from the vessel 40 via the line 38 at a temperature of about six hundred degrees fahrenheit to a surge tank 128 which communicates with the pump 129 via a line 121. Exhaust gases, vented through a stack 117, have been subjected to a heat in the combustion chamber 104 and to heat in the heater 120, preferably for a total of four seconds or more residence time to insure that no unburned contaminants (or only an insignificant amount) are vented. This provides a total residence time in burning chambers of the gases exhausted through the stack 117 of at least four seconds. It is preferred that the residence time of vapors from the line 114 in the heater 120 be at least two seconds.

Figure 2:
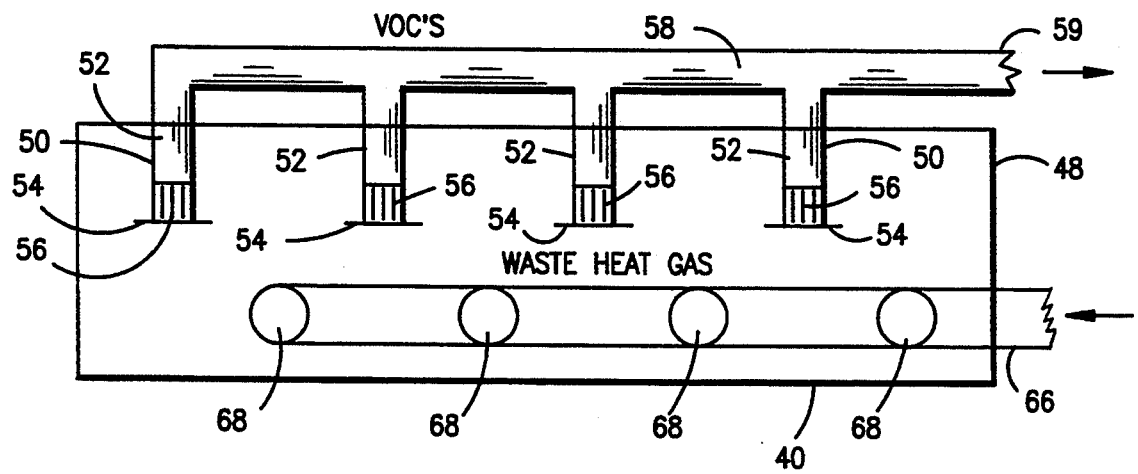
FIG. 2 is a schematic side view in cross-section of a treatment vessel of the system of FIG. 1.
Figure 3:
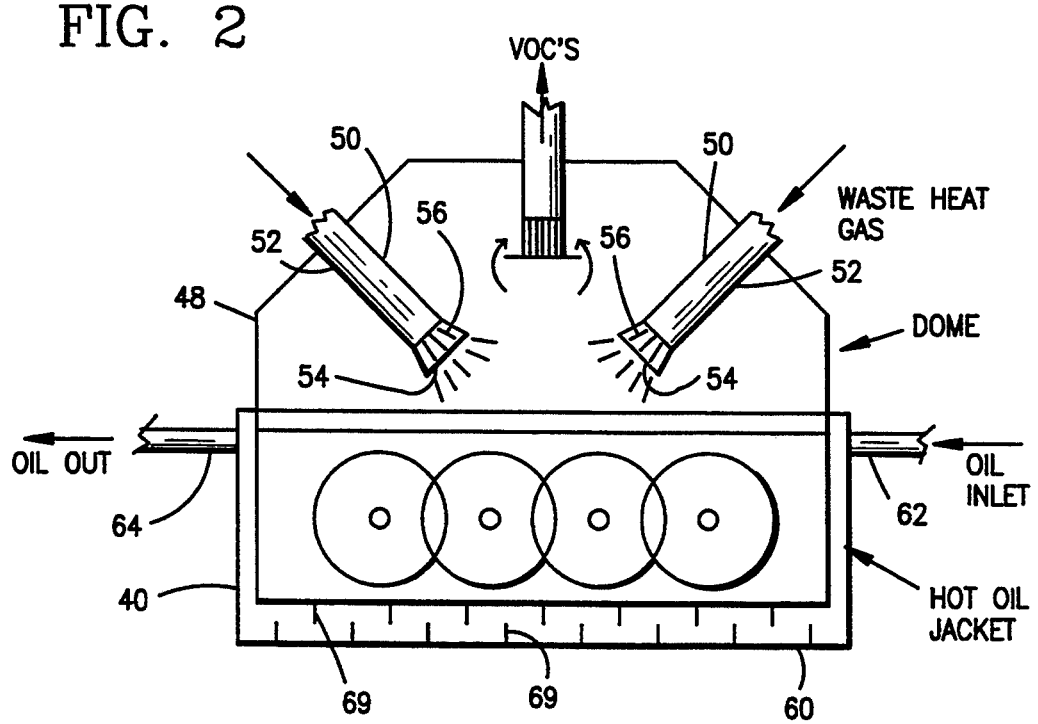
FIG. 3 is an end schematic view of the vessel of FIG. 2.

In one embodiment as disclosed in FIGS. 1–3 of a system according to the present invention, four thousandths of a pound of particulate plus unburned hydrocarbons per hour will be exhausted from the system (through the stack 117). The legally allowable rate is presently five pounds per hour. It is preferred that systems according to this invention emit one pound per hour or less of particulate and/or unburned hydrocarbons, and most preferably only one and a half thousandths of a pound of such materials per hour.

The shredder 32 shown in FIGS. 7A, 7B and 7C has a holding vessel 29 with an open top 31 through which material enters the vessel 29. A stop bar 33 mounted on a shaft 35 pushes the material down into blades below it. A cutter disc 34 mounted to the shaft 35 has a plurality of blades 46 secured thereto for shredding material. Shredded material flows from openings 150 in the disc 34 to a bottom bin 37 of the vessel 29. The disc 34 is secured on a disc carrier 48 which is rotated by one or more belts 39 which extend through a wall 41 of the vessel 29 and around a pulley 43 which is rotated by a motor 45, thus rotating the disc 34. Shredded material exits the vessel 29 through an outlet 49. Rotation of the shaft 35 is facilitated by bearings 7 at either end thereof. Support beams 9 provide structural strength to the vessel 29.

Figure 6B:
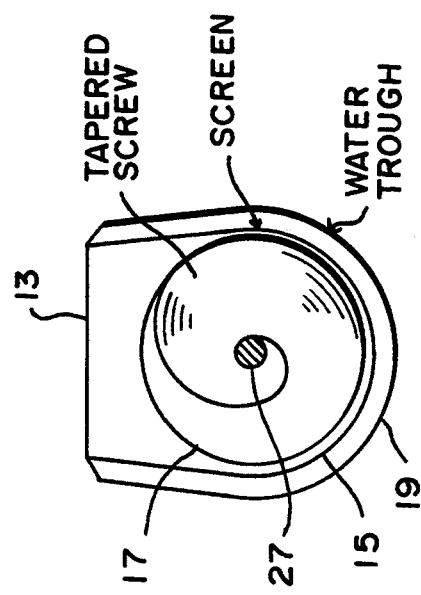
FIG. 6B is an end view of the press of FIG. 6A.

As shown in FIGS. 6A and 6B, the tapered screw press 12 has an inclined top member 13 to which is secured a semi-tubular inclined screen member 15 which encircles a portion of a tapered screw 17. Rotation of the tapered screw 17 moves material upwardly and outwardly. Water and other materials of sufficiently small largest dimension, either pushed against the screen by the screw or falling to it due to the effects of gravity, pass through the screen and fall onto an inclined trough 19 which conducts them to the outlet 22. The screw 17 is rotated by a motor 21 whose shaft 23 is interconnected with a gearbox and a shaft 27 to which the tapered screw is mounted. Although it is within the scope In conclusion, therefore, it is seen that the present invention and the embodiments disclosed herein and those covered by the appended claims are well adapted to carry out the objectives and obtain the ends set forth. Certain changes can be made in the described subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A system for removing vaporizable contaminants from flowable material, the system comprising:
   a treatment vessel,
   material introduction means for introducing material into the vessel,
   direct heating means for flowing a direct heating fluid into the treatment vessel for directly contacting and heating the material,
   indirect heating means for heating the material in the vessel, the indirect heating means having flow passages for circulating a hot fluid therethrough to indirectly heat the material,
   exhaust means communicating with the vessel through which vaporized contaminants from the material flow from the vessel,
   secondary heating means outside the vessel for heating vaporized contaminants exhausted from the vessel, and
   heat recovery means for recovering recovered heat from heated exhausted vaporized contaminants and for supplying a portion of the recovered heat directly to the direct heating means to directly heat the material in the vessel and for supplying a portion of the recovered heat to the indirect heating means to aid in indirectly heating the material.

2. The system of claim 1 wherein the material introduction means has a screened press to remove liquid from the material and a screw conveyor which conveys material to the vessel.

3. The system of claim 1 wherein the indirect heating means includes a plurality of augers rotatably mounted within the treatment vessel for contacting the material, the augers having at least one flow channel therethrough through which the hot fluid flows to indirectly heat the material.

4. The system of claim 1 wherein the exhaust means includes a dome mounted on top of the vessel and into which vaporized contaminant gases flow, the dome having at least one tubular member mounted therethrough in communication with a flow line into which the vaporized contaminant gases flow from the at least one tubular member, and a diffuser mounted near a first end of each of the at least one tubular member so that particulates in the vaporized contaminant gases are prevented by the diffuser from flowing into the at least one tubular member.

5. The system of claim 4 wherein the at least half of the particulates in the vaporized contaminant gases are prevented from flowing into the at least one tubular member.

6. The system of claim 1 wherein the heat recovery means supplies about ninety percent of recovered heat to the direct heating means and about ten percent of recovered heat to the indirect heating means.

7. The system of claim 1 wherein the heat recovery means recovers at least fifty percent of heat value of heated exhausted vaporized contaminants flowing from secondary heating means.

8. The system of claim 7 wherein the heat recovery means recovers at least ninety percent of such heat value.

9. The system of claim 1 wherein only one pound per hour or less of particulate and unburned hydrocarbons exit from the system.

10. The system of claim 9 wherein only one and one half thousandths of a pound per hour or less of particulates and unburned hydrocarbons are emitted from the system.

11. The system of claim 7 including are separation means for separating entrained particulates from a flow of vaporized contaminants from the treatment vessel.

12. The system of claim 11 wherein the separation means includes a separator which separates and removes at least five percent of the entrained particulates.

13. The system of claim 12 wherein the separator removes at least fifteen percent of the entrained particulates.

14. The system of claim 11 wherein the separation means includes a filter device having a filtration medium through which the vaporized contaminants flow and for filtering entrained particulates from the vaporized contaminants.

15. The system of claim 14 in which the filter device filters substantially all of the entrained particulates from the vaporized contaminants flowing therethrough.

16. The system of claim 14 including also air supply means for supplying air under pressure to the filtration medium to remove particulate lodged therein, the filter device including a bin for receiving dislodged particulate.

17. The system of claim 16 including air drying means for drying air supplied to the filtration medium.

18. The system of claim 17 wherein the air is dried to a moisture content of about two percent or less.

19. The system of claim 1 wherein the material in the vessel is heated to about one thousand six hundred degrees fahrenheit to vaporize vaporizable contaminants.

20. The system of claim 1 wherein the heat recovery means supplies heat to the indirect heating means in the form of hot gases, and total residence time of exhausted vaporized contaminants in the heat recovery means and of the hot gases in the indirect heating means is at least four seconds.

21. The system of claim 1 wherein in the heat recovery means substantially all combustible gases in the heated exhausted vaporized contaminants are combusted so that heated vapor flowing from the heat recovery means to the treatment vessel is substantially inert.

22. The system of claim 21 including also an oxygen level sensor and control on a line from the heat recovery means to the treatment vessel through which flows the resulting heated vapor, the sensor and control sensing a level of oxygen in the resulting heated vapor flow and shutting off such flow if the oxygen level exceeds a predetermined value.

23. The system of claim 22 wherein the predetermined value is at most eleven percent.

24. The system of claim 23 wherein the predetermined value is at most two percent.

25. A system for removing vaporizable contaminants from flowable material, the system comprising
a treatment vessel,
material introduction means for introducing the flowable material into the vessel, the material introduction means including a tapered screened press to remove liquid from the material, the press having an inclined screen containment member and a screw rotatably disposed within the screen for moving the material generally upwardly to an outlet,
indirect heating means for heating the material in the vessel, the indirect heating means having flow passages for circulating a hot indirect heating fluid therethrough, the indirect heating means including a plurality of augers rotatably mounted within the vessel for contacting the material, each auger having at least one of the flow passages therethrough,
exhaust means communicating with the vessel through which vaporized contaminants from the material with particulates entrained therein flow from the vessel, the exhaust means including a dome mounted on top of the vessel and into which the vaporized contaminants flow, the dome having at least one tubular member mounted therethrough in communication with a flow line into which the vaporized contaminants flow from the at least one tubular member, and a diffuser mounted near a first end of each of the at least one tubular member so that particulates entrained in the vaporized contaminants are prevented by the diffuser from flowing into the at least one tubular member,
direct heating means for flowing a direct heating fluid into the vessel for directly contacting and heating the material,
secondary heating means outside the vessel for heating vaporized contaminants exhausted from the vessel,
heat recovery means for recovering heat from heated vaporized contaminants exhausted from the vessel and heated by the secondary heating means, the heat recovery means also for supplying heat to the direct heating means and to the indirect heating means, the heat recovery means recovering at least about ninety percent of heat value of the heated vaporized contaminants, and about ninety percent of such recovered heat supplied to the direct heating means for flowing a direct heating fluid into the vessel for directly contacting and heating the material and about ten percent of such recovered heat to the indirect heating means, substantially all combustible gases in the heated vaporized contaminants combusted to produce a stream which is substantially inert,
one pound per hour or less of undesirable particulates and unburned hydrocarbons exiting the system, and
separation means for separating substantially all entrained particulates from a flow of vaporized contaminants from the vessel, the separation means including a separator and a filter.

26. A method for removing vaporizable contaminants from flowable material, the method comprising
introducing the material into a treatment vessel of a system,
directly heating the material in the vessel to vaporize vaporizable contaminants in the vessel,
indirectly heating the material in the vessel to vaporize vaporizable contaminants in the vessel,
exhausting vaporized contaminants with particulates entrained therein from the vessel,
heating the vaporized contaminants exhausted from the vessel in a secondary heating apparatus outside the treatment vessel, and
recovering heat from heated exhausted vaporized contaminants and supplying recovered heat both for the direct and the indirect heating of the material in the vessel.

27. The method of claim 26 including separating entrained particulates from the vaporized contaminants exhausted from the vessel.

28. The method of claim 27 wherein
substantially all of the entrained particulates are removed from the vaporized contaminants exhausted from the vessel, the heat recovery means supplies about ninety percent of recovered heat directly to the material in the vessel and about ten percent of the recovered heat to the indirect heating means, substantially all combustible gases in heated vaporized contaminants combusted to produce a vapor stream which is substantially inert, and at most one pound per hour of particulates and unburned hydrocarbons emitted from the system.

* * * * *